E. HILL & F. C. ROWLAND.
PUMP-VALVE.
No. 181,168. Patented Aug. 15, 1876.
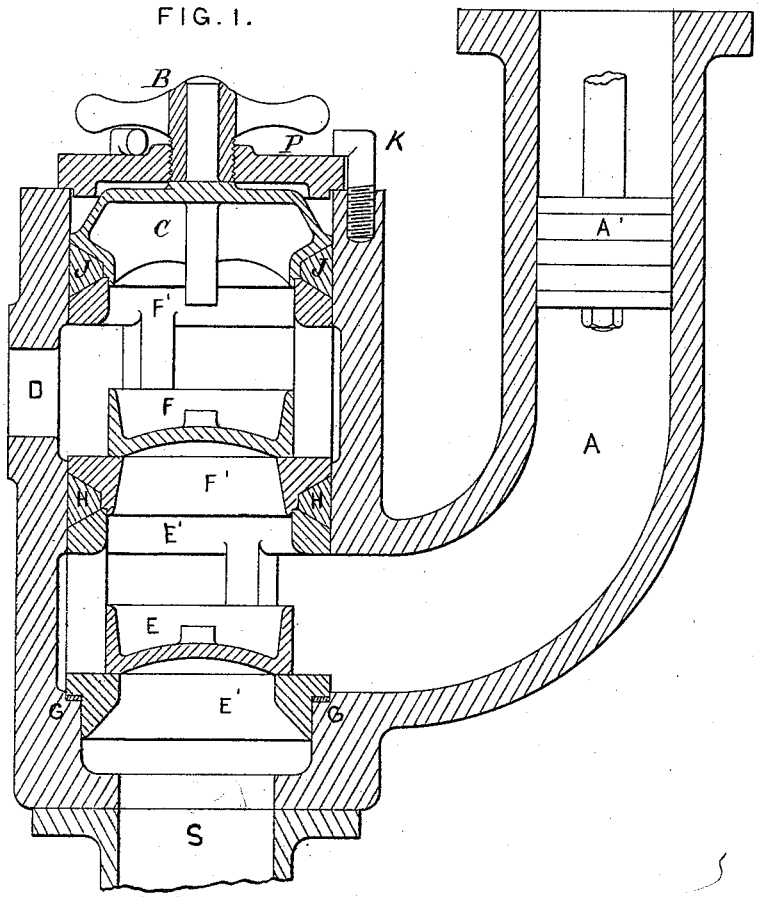
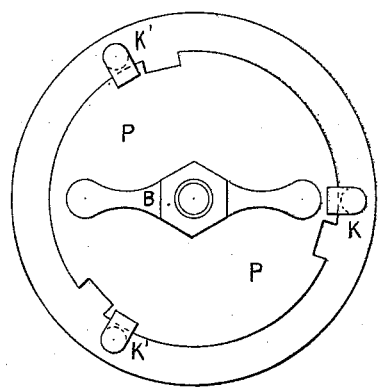

UNITED STATES PATENT OFFICE.

EBENEZER HILL, OF SOUTH NORWALK, AND FREDERICK C. ROWLAND, OF NEW HAVEN, CONNECTICUT.

IMPROVEMENT IN PUMP-VALVES.

Specification forming part of Letters Patent No. 181,168, dated August 15, 1876; application filed June 2, 1876.

*To all whom it may concern:*

Be it known that we, EBENEZER HILL, of South Norwalk, and FREDERICK C. ROWLAND, of New Haven, Connecticut, have invented a new and useful Improvement in Pump-Valves, which improvement is fully set forth in the following specification, reference being had to the accompanying drawings.

This invention pertains to certain improvements in the construction of valves and valve-chambers for pumps; and the invention consists, chiefly, in making the valve-chamber cylindrical in form, and of the same diameter internally down to the seat of the suction-valve, and then placing the valves in cages, and so forming said cages that when superimposed, one upon the other, they will hold each other in working position, and at the same time confine the packing between each cage or valve-chamber, as will hereinafter appear.

Figure 1 is a vertical section of the valve-chamber and valves, with a portion of a pump attached. Fig. 2 is a plan of the cap of the valve-chamber; and Fig. 3 is a view, in perspective, of one of the valve-cages.

At A is represented a portion of the barrel of a single-acting pump, with its piston at A'. At S is shown the suction-pipe, and at D the discharge. At E is the suction-valve, and at F the discharge-valve. These are what are generally termed "cage-valves," and their respective cages are shown at E' and F'. The valve-chamber is shown at V, and is a plain cylinder cast on one side of the pump-cylinder, or may be cast separately and then attached in any convenient manner, as by screws, bolts, or clamps.

Its interior, as shown in the drawings, is simply a plain hole from the top to the under side of the lower valve, and into this hole from the top the cages and valves and their packings are all readily placed or easily removed therefrom when desired. At the proper depth in this hand-hole a shoulder of the casting is faced off, and upon this shoulder rests the cage E' of the lower or suction valve E. A ring or gasket of rubber, or some similar packing, as at G, is placed between the cage and the shoulder to close the joint. Above or upon the cage E' there is placed the discharge-valve cage F', with an elastic packing, as at H, between them, and upon the cage F' is a cap, C, having between it and the cage F' a packing-ring, as at J, and said cap is held down by a plate or cap, P, and stud-bolts K, they performing the office of a yoke, as on any ordinary hand-holes. The thumb-screw B bears centrally upon the cap C, forcing it down upon the washer J and upon the top of the valve-cage F', and thereby seals the joint above the discharge-valve. So, also, the cage F' is forced upon the packing H, and thereby seals the joint between the suction and discharge valves, and the cage E' is forced down upon the packing at G, and thereby seals that joint, so that by the single operation of the one screw all the valves and their packings are held in proper working position.

We prefer to use washers or packings of rubber; but it is evident that any other elastic packing, as hemp, leather, &c., may be used.

We therefore claim—

1. The combination, in a valve-chamber, of the valve-cages and interposed packing, substantially as described.

2. The combination of the screw B, cap C, cages F' and E', placed one upon the other, and with interposed packings, substantially as described.

EBENEZER HILL.
FREDERICK C. ROWLAND.

Attest:
GEORGE C. MOORE,
WM. L. FINCH.